United States Patent

Murphy et al.

[11] Patent Number: 5,616,252
[45] Date of Patent: Apr. 1, 1997

US005616252A

[54] WATER TREATMENT PROCESS FOR NITRATE REMOVAL

[75] Inventors: Andrew P. Murphy, Littleton; Charles D. Moody, Morrison, both of Colo.

[73] Assignee: The United States of America as represented by the Secretary of the Interior, Washington, D.C.

[21] Appl. No.: 490,261

[22] Filed: Jun. 14, 1995

[51] Int. Cl.⁶ .................................................. C02F 1/58
[52] U.S. Cl. ........................... 210/728; 210/729; 210/903
[58] Field of Search ................................ 210/719, 725, 210/727, 728, 729, 757, 903

[56] References Cited

U.S. PATENT DOCUMENTS

| | | | |
|---|---|---|---|
| 4,479,877 | 10/1984 | Guter | 210/670 |
| 4,746,413 | 5/1988 | Pott et al. | 204/129.75 |
| 4,968,436 | 11/1990 | Gutekunst et al. | 210/903 |
| 5,069,800 | 12/1991 | Murphy | 210/757 |

*Primary Examiner*—Peter A. Hruskoci
*Attorney, Agent, or Firm*—E. Philip Koltos

[57] ABSTRACT

An ion exchange process utilizes a chemical system in which sodium nitrate is reacted with an acidic solution of urea to selectively precipitate nitrate ions from waste brine in the presence of chloride ions, thereby allowing for the recycling of the brine regenerant.

7 Claims, No Drawings

WATER TREATMENT PROCESS FOR NITRATE REMOVAL

FIELD OF THE INVENTION

The present invention is directed to an improvement on conventional ion exchange processes for removing nitrates from waste water and, more particularly, to a method which allows for the recycling of brine regenerant using a chemical system which causes the selective precipitation of nitrate ion in the presence of chloride ion.

BACKGROUND OF THE INVENTION

The presence of high levels of nitrates in water is known to cause harmful physiological effects in humans. Consequently, potable water supplies are typically treated in an ion exchange process to at least reduce the nitrate levels. During some point in an ion exchange process, it is necessary to regenerate the anion exchange resins by washing with a regenerant. This is typically achieved by using a single pass of concentrated brine, i.e., water which is nearly saturated with salts, through the resin columns of the ion exchange process. Sodium chloride (NaCl) brine is most often utilized because of its low cost.

Unfortunately, the advantages of using NaCl brine are offset by the high cost of disposal of the resulting waste brine which contains nitrate and chloride ions. If a method could be found to remove the nitrate ion relative to the chloride ion, then the waste brine could be reused as a regenerant.

One of the most widely used methods of removing nitrate ion from waste brine, biological denitrification, suffers from several drawbacks associated with the use of living organisms. These drawbacks include undesirable dilutions to avoid high ionic strength problems with microorganisms, difficulties in maintaining a viable culture of bacteria, high cost of chemicals to maintain the bacterial culture and unpredictable reaction rates. The method also utilizes relatively large equipment. In addition, the use of bacterial cultures can result in contamination of drinking water.

Another method of removing nitrate ion from waste brine is biological recycling. Like biological denitrification, this method also suffers from the drawbacks associated with maintaining living organisms. These drawbacks include high nutrient costs to keep the bacterial culture alive, possible contamination to drinking water, and slow and/or unpredictable reaction rates. In addition, because the waste brine must be diluted to allow the microorganisms to denitrify it, the process requires the additional time-consuming step of reconcentrating the brine to regenerate the exchangers.

Other methods of removing nitrate ion from waste brine include the selective ion exchange method disclosed in U.S. Pat. No. 4,479,877 to Guter and an oxidation-reduction scheme disclosed in U.S. Pat. No. 5,069,800 to Murphy. The Guter process tends to be relatively expensive because of the cost of ion exchange resins which lose capacity over time due to oxidation, as well as the high cost of regenerant solutions and their associated disposal costs. Similarly, there are considerable expenses associated with the reducing agent used in the Murphy process and the undesirable reaction products left in the effluent require additional post-treatment steps.

SUMMARY OF THE INVENTION

Thus, it is a purpose of the invention to overcome the disadvantages of the prior art and thereby provide a cost-effective and safe method for removing nitrate ion from waste water.

According to the method of the invention nitrate ion is removed from chloride-containing waste water by contacting the waste water with an acidic solution of urea.

It is, therefore, an object of the invention to provide a method for removing nitrate from waste water which does not utilize bacterial cultures.

It is another object of the invention to provide a method for removing nitrate from waste water which utilizes a chemical system having a predictable and relatively short reaction time.

These and other objects of the invention will become apparent from the detailed description to follow.

DESCRIPTION OF THE PREFERRED EMBODIMENTS

The method of the invention is an improvement on the process disclosed in U.S. Pat. No. 4,479,877 to Guter, which is herein incorporation by reference. In accordance with the method, nitrate ion ($NO_3^-$) is selectively precipitated from waste brine water containing chloride ion using solutions of urea and acid based on the following chemical reaction:

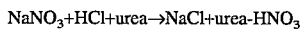

$$NaNO_3 + HCl + urea \rightarrow NaCl + urea\text{-}HNO_3$$

The resulting precipitate, urea-$HNO_3$, is then removed allowing for the recycling of the brine water as a regenerant in an ion exchange process. Sulfuric acid may also be used as an alternative to hydrochloric acid (HCl).

The effectiveness of the method of the invention was demonstrated through comparison tests in which $NaNO_3$ was reacted with varying concentrations of urea and HCl in the presence of NaCl. The concentrations of chloride and nitrate ions in these samples were then compared with control samples to which neither urea nor HCl was added. The concentrations of $NaNO_3$ and NaCl used were those typically found in waste brine after a single pass through a resin column which has been used to treat nitrate containing water. However, the method is equally effective at higher NaCl and $NaNO_3$ concentrations, since the reaction between $NaNO_3$, HCl and urea is a precipitation reaction. Thus, there is no need for dilution of the waste water prior to treatment in accordance with the method of the invention.

To demonstrate the effectiveness of the method of the invention, test samples were prepared by first starting with solutions of NaCl and $NaNO_3$. Urea and HCl then were added to yield the final concentrations listed in the table below. The table shows the initial concentrations of the reagents in the test samples in moles/liter. 20 milliliters of each test sample was added to a glass scintillation vial. The vials marked "A" were placed in a freezer at a temperature of −20° C., the vials marked "B" were placed in a refrigerator at a temperature of 0° C. and the vials marked "C" were placed in a water bath at a temperature of 25° C. All vials were held at these constant temperatures overnight for a period of ten hours. The time period of ten hours was chosen as a matter of convenience, although less time is required in practice. The samples were then decanted and analyzed for chloride and nitrate ion. The resultant product, urea-$HNO_3$, appeared as a white precipitate at the bottom of the vials. The final concentrations of NaCl and $NaNO_3$ for each sample are also shown in the table.

| Concentration and Results of Reagents in Moles/L | | | | | | | | | |
| --- | --- | --- | --- | --- | --- | --- | --- | --- | --- |
| | | Initial | Final | Initial | Final | Initial | Final | Initial | Final |
| | | Sample 1 | | Sample 2 | | Sample 3 | | Sample 4 | |
| A | NaCl | 3.42 | 3.92 | 3.42 | 4.68 | 3.42 | 5.39 | 3.42 | 3.41 |
| | NaNO$_3$ | 1.18 | 0.794 | 1.18 | 0.413 | 1.18 | 0.135 | 1.18 | 1.18 |
| | Urea | .591 | | 1.18 | | 2.36 | | 0 | |
| | HCl | .591 | | 1.18 | | 2.36 | | 0 | |
| | | Sample 5 | | Sample 6 | | Sample 7 | | Sample 8 | |
| B | NaCl | 3.42 | 3.87 | 3.42 | 4.63 | 3.42 | 5.59 | 3.42 | 3.41 |
| | NaNO$_3$ | 1.18 | 1.16 | 1.18 | 0.718 | 1.18 | 0.345 | 1.18 | 1.18 |
| | Urea | .591 | | 1.18 | | 2.36 | | 0 | |
| | HCl | .591 | | 1.18 | | 2.36 | | 0 | |
| | | Sample 9 | | Sample 10 | | Sample 11 | | Sample 12 | |
| C | NaCl | 3.42 | 3.89 | 3.42 | 4.40 | 3.42 | 5.56 | 3.42 | 3.41 |
| | NaNO$_3$ | 1.18 | 1.15 | 1.18 | 1.15 | 1.18 | 0.855 | 1.18 | 1.18 |
| | Urea | .591 | | 1.18 | | 2.36 | | 0 | |
| | HCl | .591 | | 1.18 | | 2.36 | | 0 | |

The lowest concentrations of NaNO$_3$ in the final product were achieved at a ratio of 2:1 urea/HCl to NaNO$_3$ and a temperature of −20° C. Further, the data shows that nitrate removal improves with increasing ratio of hydrogen ion to NaNO$_3$, increasing ratio of urea to NaNO$_3$ and decreasing temperature between −20° to 25° C.

The reaction time of 10 hours is low compared to most nitrate control processes. In prior art methods which utilize bacterial cultures, for example, reaction times can be much longer. Further, the recovery of nitrate is at least as high as that achieved using conventional prior art methods.

The method of the invention is advantageous because both urea and acid are relatively inexpensive and are safe and nontoxic when properly handled. Other advantages are that the precipitated product, urea-HNO$_3$, may be added to lime and used as a fertilizer. Also, existing ion exchange denitrification plants are easily converted to the method of the invention without large capital equipment costs.

Although the invention has been described in considerable detail with respect to preferred embodiments thereof, variations and modifications will be apparent to those skilled in the art without departing from the spirit and scope of the invention as set forth in the claims.

We claim:

1. A method of precipitating a nitrate containing solid from waste brine containing sodium nitrate and chloride ions comprising reacting said waste brine with a sufficient quantity of acid and urea to form a urea-HNO$_3$ precipitate.

2. The method according to claim 1 wherein said acid is selected from the group consisting of hydrochloric acid and sulfuric acid.

3. The method according to claim 1 wherein a molar ratio of hydrogen ions to said sodium nitrate ranges from 0.5 to 2.

4. The method according to claim 1 wherein a molar ratio of urea to said sodium nitrate ranges from 0.5 to 2.

5. A method of removing nitrate ion from waste water containing sodium nitrate and chloride ions comprising the steps of:

contacting said waste water with a sufficient quantity of an acidic solution of urea to form a urea-HNO$_3$ precipitate; and recovering said precipitate from said waste water.

6. The method according to claim 5 wherein said acid is selected from the group consisting of hydrochloric acid and sulfuric acid.

7. The method according to claim 5 further comprising the step of adjusting temperature of said waste water and said solution in a range of −20° to 25° C.

\* \* \* \* \*